(12) United States Patent
Wang et al.

(10) Patent No.: US 10,500,682 B2
(45) Date of Patent: *Dec. 10, 2019

(54) ROLLER STRUCTURE

(71) Applicant: FIVETECH TECHNOLOGY INC., New Taipei (TW)

(72) Inventors: Ting-Jui Wang, New Taipei (TW); Martin Chao, New Taipei (TW); Aias Lin, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 297 days.

This patent is subject to a terminal disclaimer.

(21) Appl. No.: 15/139,388

(22) Filed: Apr. 27, 2016

(65) Prior Publication Data

US 2016/0238080 A1   Aug. 18, 2016

Related U.S. Application Data (63) Continuation-in-part of application No. 14/940,222, filed on Nov. 13, 2015, now Pat. No. 10,458,464.

(30) Foreign Application Priority Data

Nov. 17, 2014 (TW) .............................. 103139832 A (51) Int. Cl.
*F16C 13/02* (2006.01)
*B23P 15/00* (2006.01)
(Continued)

(52) U.S. Cl.
CPC .......... *B23P 15/003* (2013.01); *F16C 13/006* (2013.01); *F16C 13/02* (2013.01);
(Continued)

(58) Field of Classification Search
CPC .. F16C 13/022; F16C 13/006; F16C 2226/50; F16C 13/02; F16C 17/10; F16C 2226/52; F16C 29/045; Y10T 16/364
See application file for complete search history.

(56) References Cited

U.S. PATENT DOCUMENTS 4,102,009 A * 7/1978 Kelly ................. E05D 15/0669
16/100
4,269,550 A * 5/1981 DiGiulio ............... B23B 49/023
29/432

(Continued)

*Primary Examiner* — Sarang Afzali
(74) *Attorney, Agent, or Firm* — Schmeiser, Olsen & Watts, LLP (57) ABSTRACT

A roller structure and a manufacturing method thereof are introduced. The roller structure includes a roller rotatable about an axial portion, an end of a bush is fixed to an end of the axial portion, and another end of the bush having an engaging portion coupled to a load, a first stop portion disposed at another end of the axial portion and the bush has a second stop portion positioned opposite to the first stop portion such that the roller rotates between the first stop portion and the second stop portion; wherein the engaging portion of the bush has a feeding space that receives a material of the load to couple the engaging portion to the load. Hence, the roller structure and the manufacturing method thereof provide a modularized roller structure for carrying a load, effectuate modularized assembly and production, enhance assembly efficiency, attain structural streamlining, and cut costs.

15 Claims, 11 Drawing Sheets

(51) Int. Cl.
*F16C 13/00* (2006.01)
*F16C 17/10* (2006.01)
*F16C 29/04* (2006.01)

(52) U.S. Cl.
CPC ............ *F16C 17/10* (2013.01); *F16C 29/045* (2013.01); *F16C 2226/50* (2013.01); *F16C 2226/52* (2013.01); *F16C 2314/72* (2013.01); *F16C 2350/00* (2013.01)

(56) References Cited

U.S. PATENT DOCUMENTS

| | | | | |
|---|---|---|---|---|
| 5,070,575 | A * | 12/1991 | Redman | E05D 15/0634 16/105 |
| 7,021,007 | B2 * | 4/2006 | Jacobs | E05D 15/0669 16/87 R |
| 7,654,608 | B2 * | 2/2010 | Krajenke | E05D 15/101 296/155 |
| 7,849,560 | B2 * | 12/2010 | Kelley | E05D 15/066 16/105 |
| 8,308,221 | B2 * | 11/2012 | Kitayama | B60J 5/06 16/91 |
| 8,690,434 | B2 * | 4/2014 | Desrosiers | E05F 5/003 16/91 |
| 8,881,460 | B2 * | 11/2014 | Bouthillier | E05D 15/063 49/409 |
| 9,206,834 | B2 * | 12/2015 | Tseng | F16B 39/02 |
| 2004/0256333 | A1 * | 12/2004 | Buhlmeyer | A47L 15/507 211/41.9 |

* cited by examiner

ROLLER STRUCTURE

CROSS-REFERENCE TO RELATED APPLICATION

This application is a continuation-in-part patent application of U.S. application Ser. No. 14/940,222 filed on Nov. 13, 2015, the entire contents of which are hereby incorporated by reference for which priority is claimed under 35 U.S.C. § 120.

FIELD OF THE INVENTION

The present invention relates to roller structures and manufacturing methods thereof and, more particularly, to a roller structure and a manufacturing method thereof, characterized in that a load is mounted on and thus carried by the roller structure.

BACKGROUND OF THE INVENTION

Rollers enable heavy objects, such as a frame or sliding doors, drawers and shelves of a cabinet, to be easily moved. Rollers work efficiently, because of the relatively small friction between each rotating roller and its rail or a surface. However, there is still room for improvement in conventional roller structures and manufacturing methods thereof. For example, an assembly structure of a conventional roller is structurally intricate, and the assembly operation or process is complicated, thereby compromising its production efficiency. In addition, the conventional roller structures seldom match the other components in wide use, such as pivots, for modularization, and in consequence roller manufacturers have to manufacture the components and perform the subsequent time-consuming assembly process independently.

Accordingly, it is imperative to provide a roller structure and a manufacturing method thereof with a view to overcoming the aforesaid drawbacks of the prior art.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a roller structure and a manufacturing method thereof as disclosed in the present invention to thereby provide a modularized roller structure for carrying a load, effectuate modularized assembly and production, enhance assembly efficiency, attain structural streamlining, and cut costs.

It is an objective of the present invention to provide a roller structure and a manufacturing method thereof to thereby provide a modularized roller structure for carrying a load, effectuate modularized assembly and production, enhance assembly efficiency, attain structural streamlining, and cut costs.

In order to achieve the above and other objectives, the present invention provides a roller structure, comprising: a roller rotatable about an axial portion, an end of a bush is disposed to an end of the axial portion, and another end of the bush having an engaging portion coupled to a load; and a second stop portion disposed at another end of the axial portion and positioned proximate to a side of the roller such that the roller rotates between the first stop portion and the second stop portion.

As regards the roller structure, the bush has a first stop portion positioned proximate to another side of the roller.

As regards the roller structure, the roller comprises an axial hole which the axial portion is disposed in to enable the roller to rotate about the axial portion.

As regards the roller structure, the bush formed integrally with or coupled to the axial portion.

As regards the roller structure, the second stop portion formed integrally with or coupled to the axial portion.

As regards the roller structure, the second stop portion is formed by injection molding.

As regards the roller structure, the second stop portion is in the form of a stop component fitted around the axial portion, and the axial portion has a third stop portion for limiting movement of the stop component.

The roller structure comprises a connection component coupled to the axial portion, wherein the second stop portion is provided in the form of a stop component whose movement is limited by the connection component.

As regards the roller structure, the stop component is provided in the form of a hollow-core component penetrable by the connection component.

As regards the roller structure, a receiving chamber concentric with the axial portion is disposed on one or two sides of the roller and adapted to receive one of the first stop portion, the second stop portion and the third stop portion.

As regards the roller structure, a limiting portion is disposed on a side of the roller such that the second stop portion is confined to between the limiting portion and the roller.

As regards the roller structure, the first stop portion of the bush separates the roller and the load.

As regards the roller structure, the roller comprises one of an inner ring, a rolling component and a sliding component for fitting around the axial portion.

As regards the roller structure, a rolling surface of the roller is striped.

As regards the roller structure, the roller is made of a single-ingredient material, such as a metal, a plastic or a rubber, or a multiple-ingredient material.

As regards the roller structure, the second stop portion penetrates the axial portion, or the second stop portion penetrates the axial portion and the bush, or the axial portion penetrates the second stop portion.

As regards the roller structure, the second stop portion penetrates the axial portion and is coupled to the axial portion by a riveting mechanism, an expansion mechanism, a welding mechanism, an engaging mechanism, a fastening mechanism, an adhesion mechanism or a magnetic attraction mechanism, or the second stop portion penetrates the axial portion and the bush and is coupled to the bush by a riveting mechanism, an expansion mechanism, a welding mechanism, an engaging mechanism, a fastening mechanism, an adhesion mechanism or a magnetic attraction mechanism.

As regards the roller structure, the engaging portion of the bush is positioned proximate to a side of the load such that the bush and the load are coupled together by a connection component.

The roller structure comprises a frame which the engaging portion of the bush and the load are coupled to.

As regards the roller structure, the frame is slender or plate-shaped.

As regards the roller structure, the frame is coupled to the load by a riveting mechanism, an expansion mechanism, a welding mechanism, an engaging mechanism, a fastening mechanism, an adhesion mechanism or a magnetic attraction mechanism.

As regards the roller structure, the roller and the axial portion are coupled to the bush and the second stop portion to form a module and then the engaging portion of the bush is coupled to the load.

As regards the roller structure, the roller and the axial portion are coupled to the second stop portion to form a module so as for the bush to be coupled to the load to form a module and eventually for the axial portion to be coupled to the bush.

As regards the roller structure, the engaging portion of the bush is coupled to the load by a riveting mechanism, an expansion mechanism, a welding mechanism, an engaging mechanism, a fastening mechanism, an adhesion mechanism or a magnetic attraction mechanism.

As regards the roller structure, the engaging portion of the bush has a feeding space which a material of the load is injected into via a die such that the engaging portion is coupled to the load.

As regards the roller structure, a diameter of the engaging portion is larger or smaller than a diameter of the roller.

As regards the roller structure, the feeding space faces the roller or faces away from the roller.

As regards the roller structure, the engaging portion coupled to the load via pressing the second stop portion, pressing the roller, pressing the engaging portion or pressing the first stop portion.

As regards the roller structure, the engaging portion coupled to the frame via pressing the second stop portion, pressing the roller or pressing the engaging portion.

The present invention further provides a manufacturing method of the roller structure, and the manufacturing method includes the step of forming the second stop portion positioned proximate to a side of the roller by using a die in performing a pressing process on a pressed portion at another end of the axial portion.

As regards the manufacturing method, the engaging portion of the bush is coupled to the load by a riveting mechanism, an expansion mechanism, a welding mechanism, an engaging mechanism, a fastening mechanism or a magnetic attraction mechanism.

As regards the manufacturing method, the engaging portion of the bush has a feeding space which a material of the load is injected into via a die such that the engaging portion is coupled to the load; or the engaging portion of the bush is transformed via a die to have a feeding space, the feeding space receives a material of the load to couple the engaging portion to the load.

As regards the manufacturing method, the feeding space faces the roller or faces away from the roller.

As regards the manufacturing method, a diameter of the engaging portion is larger or smaller than a diameter of the roller.

As regards the manufacturing method, the engaging portion coupled to the load via pressing the second stop portion, pressing the roller, pressing the engaging portion or pressing the first stop portion.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
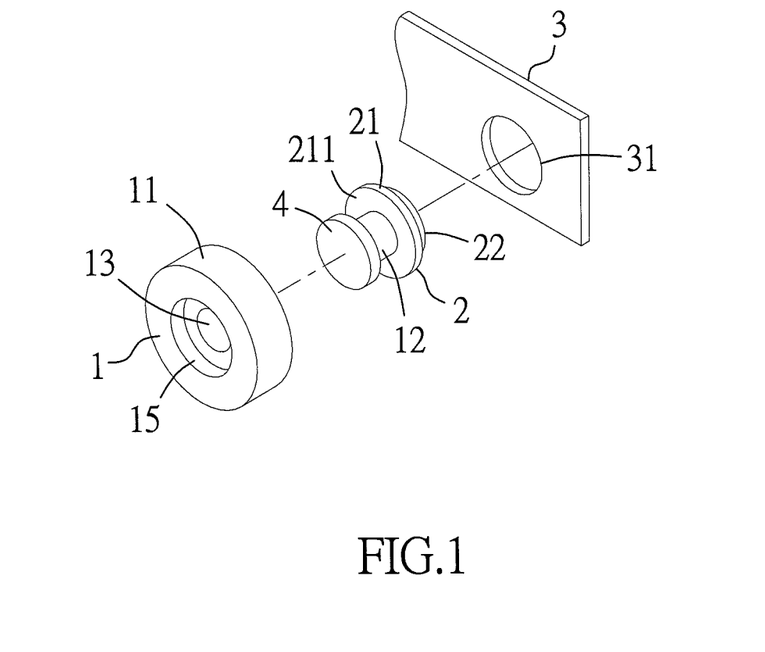
FIG. 1 is an exploded view of a roller structure according to the first preferred embodiment of the present invention.
Figure 2:
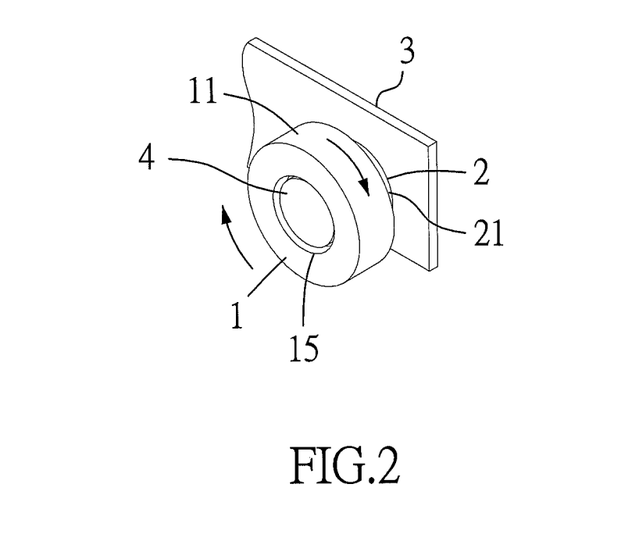
FIG. 2 is a perspective view of the roller structure according to the first preferred embodiment of the present invention.
Figure 3:
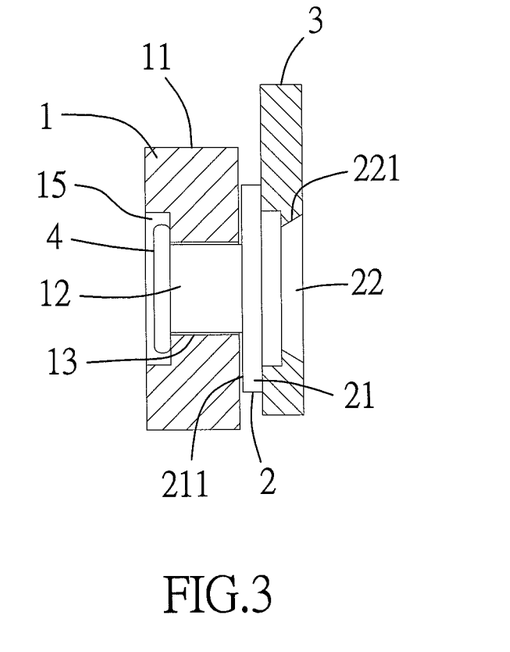
FIG. 3 is a cross-sectional view 1 of the roller structure according to the first preferred embodiment of the present invention.
Figure 4:
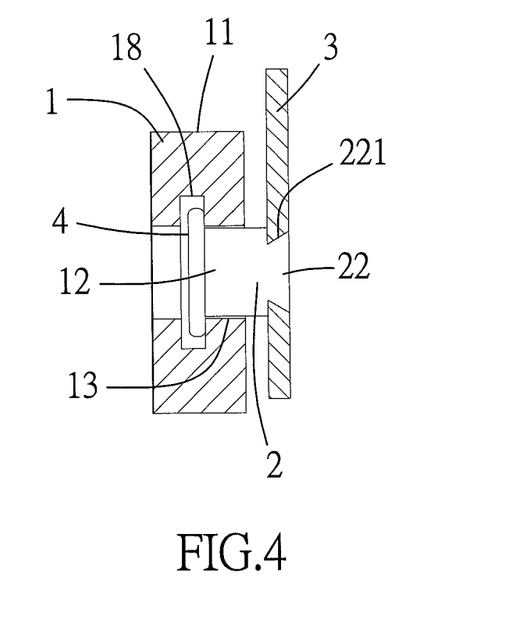
FIG. 4 is a cross-sectional view 2 of the roller structure according to the first preferred embodiment of the present invention.

Referring to FIG. 1 through FIG. 3, the present invention provides a roller structure and a manufacturing method thereof, applicable to rollers. In a preferred embodiment of the present invention, the roller structure comprises a roller 1 and a second stop portion 4. The roller 1 is adapted to carry a load 3 and made of a single-ingredient material, such as a metal, a plastic or a rubber, or a multiple-ingredient material. The roller 1 is a cylinder circumferentially provided with a rolling surface 11 for contact with any other object regardless of whether the roller 1 is rotating or not. The rolling surface 11 is either glossy or striped. When striped, the rolling surface 11 exhibits stripes which run longitudinally, transversely, obliquely or cross each other. The roller 1 is centrally provided with an axial portion 12 for driving the roller 1 to rotate. Preferably, the axial portion 12 is disposed in an axial hole 13 disposed centrally at the roller 1 such that the roller 1 rotates about the axial portion 12. The roller 1 is coupled to a load 3 through the axial portion 12 and a bush 2. Preferably, the bush 2 is a cylinder made of a single-ingredient material, such as a metal or a plastic, or a multiple-ingredient material. One end of the bush 2 is formed integrally with or coupled to one end of the axial portion 12 and enclosed with a first stop portion 21 adjacent to the roller 1. The first stop portion 21 has a first stop surface 211 corresponding in position to a side of the roller 1. Another end of the bush 2 has an engaging portion 22. The bush 2 is coupled to the load 3 through the engaging portion 22. The first stop portion 21 separates the roller 1 and the load 3 to thereby prevent the roller 1 from coming into contact with the load 3; hence, the roller 1 is rotatably disposed at the load 3. The second stop portion 4 serves to limit disconnection-proof components or structures disposed in the axial direction of the roller 1 and, in a preferred embodiment, is formed integrally with or coupled to another end (facing away from the bush 2) of the axial portion 12 and positioned proximate to another side (facing away from the bush 2) of the roller 1; hence, the roller 1 rotates between the first stop portion 21 and the second stop portion 4 to therefore effectuate the roller structure of the present invention. In addition, referring to FIG. 4, in a variant embodiment of the present invention, the roller structure is dispensed with the first stop portion 21. Referring to FIG. 4, an inner annular groove 18 is disposed on another side of the roller 1 to fix movably around the circumferential edge of the second stop portion 4.

Figure 6:
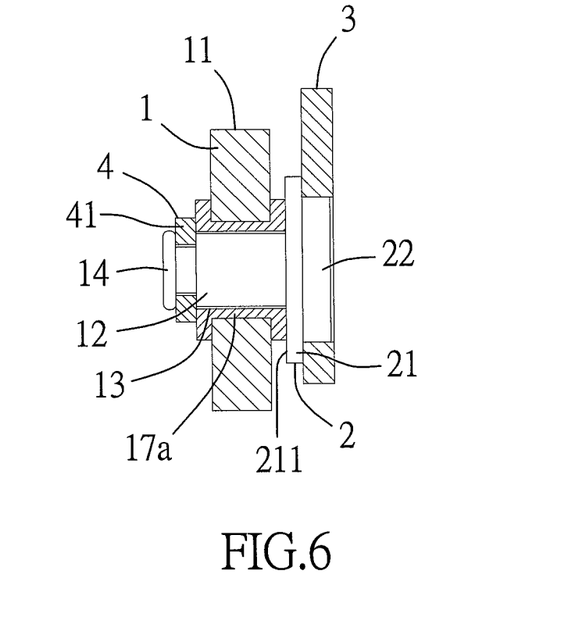
FIG. 6 is a cross-sectional view of the roller structure according to the third preferred embodiment of the present invention.
Figure 7:
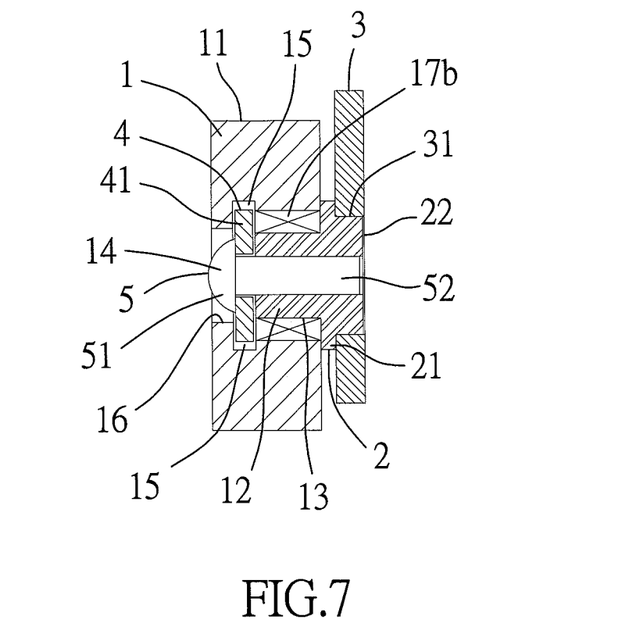
FIG. 7 is a cross-sectional view of the roller structure according to the third preferred embodiment of the present invention.
Figure 8:
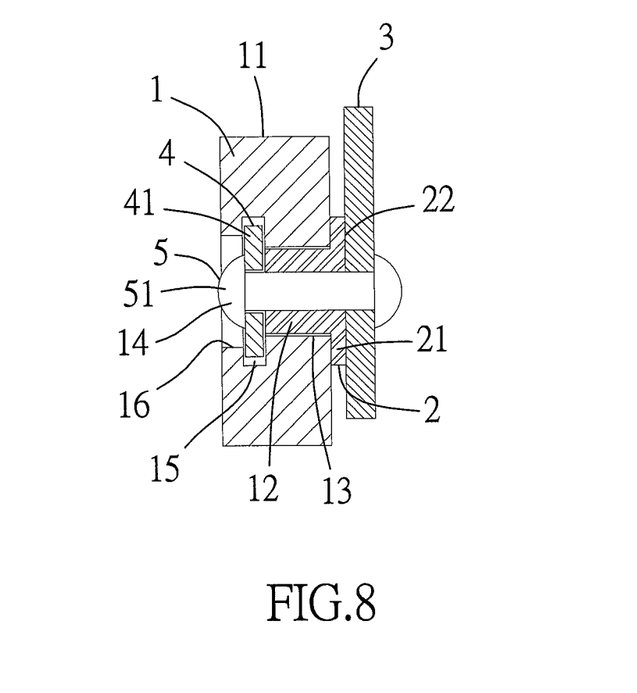
FIG. 8 is a cross-sectional view of the roller structure according to the third preferred embodiment of the present invention.

Referring to FIG. 3, FIG. 4, FIG. 5 and FIG. 9, in an embodiment of the present invention, the second stop portion 4 is preferably formed at another end of the axial portion 12 by injection molding in a manner that the second stop portion 4 has a larger diameter than the axial portion 12 so as to limit the movement of the roller 1 from another side thereof. Referring to FIG. 6, FIG. 7 or FIG. 8, in another embodiment of the present invention, the second stop portion 4 is provided with a stop component 41 which has a larger diameter than the axial portion 12 and functions as a hollow-core component, ring, C-ring, clip, bush or bearing for use in penetrable coupling or snug engagement such that the stop component 41 is fitted around the axial portion 12. Preferably, the axial portion 12 has a third stop portion 14 for limiting the movement of the stop component 41. In an embodiment of the present invention, the third stop portion 14 is formed by performing a pressing process on another end of the axial portion 12 (as shown in FIG. 6) such that the stop component 41 is coupled to the axial portion 12 firmly. In a variant embodiment of the present invention, the third stop portion 14 is provided in the form of a head portion 51 of a connection component 5 such that a body portion 52 of the connection component 5 is coupled to the axial portion 12 and the bush 2 (shown in FIG. 7 and FIG. 8); hence, the movement of the stop component 41 is limited by the third stop portion 14 formed from the head portion 51 of the connection component 5, thereby allowing the stop component 41 to be coupled to the axial portion 12 firmly.

Figure 5:
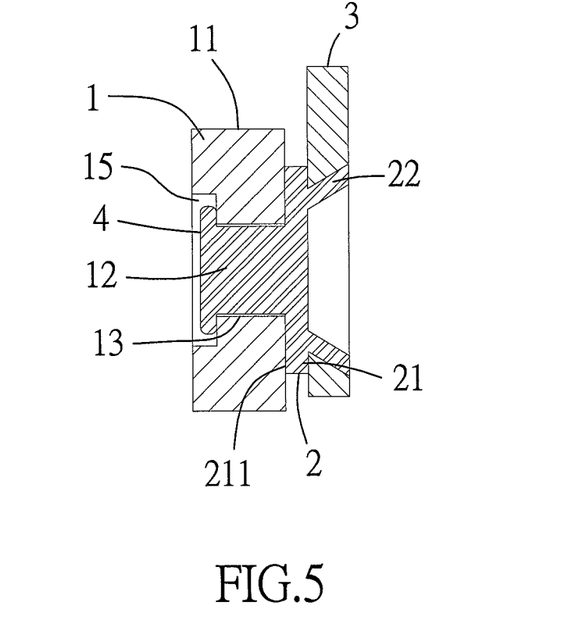
FIG. 5 is a cross-sectional view of the roller structure according to the second preferred embodiment of the present invention.

Referring to FIG. 3 and FIG. 5, a receiving chamber 15 concentric with the axial portion 12 is disposed on one or two sides of the roller 1 and is round, polygonal or of any appropriate geometric shape such that the first stop portion 21, the second stop portion 4 or the third stop portion 14 is received in the receiving chamber 15 of the roller 1 to thereby prevent the first stop portion 21, the second stop portion 4 or the third stop portion 14 from protruding from the roller 1 laterally. Referring to FIG. 7 and FIG. 8, a limiting portion 16 is disposed on another side of the roller 1 and provided in the form of a neck portion disposed on the inner wall of the receiving chamber 15 to not only confine the second stop portion 4 to between the limiting portion 16 and the roller 1 but also prevent the roller 1 from loosening.

Figure 9:
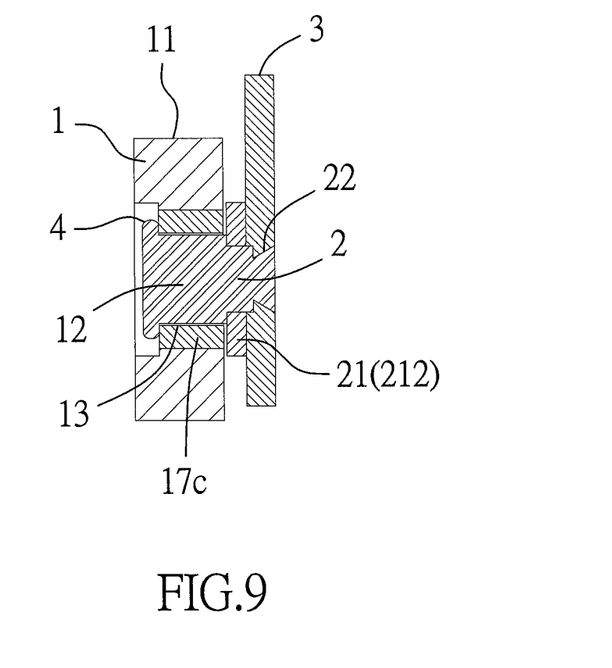
FIG. 9 is a cross-sectional view of the roller structure according to the third preferred embodiment of the present invention.
Figure 10:
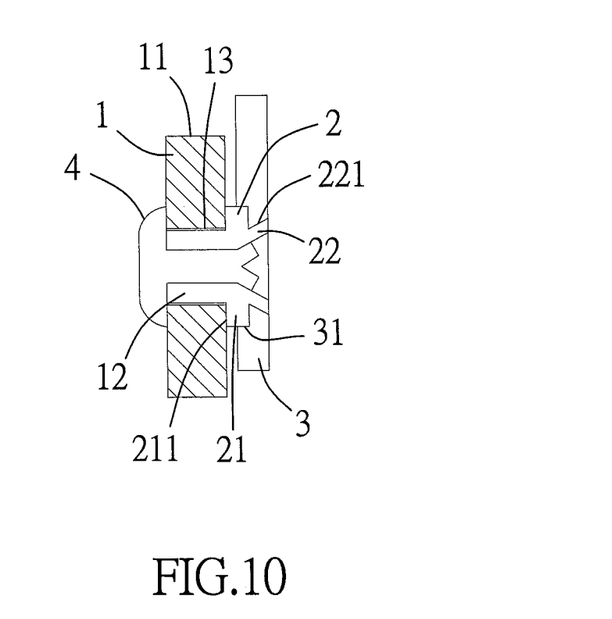
FIG. 10 is a cross-sectional view of the roller structure according to the fourth preferred embodiment of the present invention.
Figure 11:
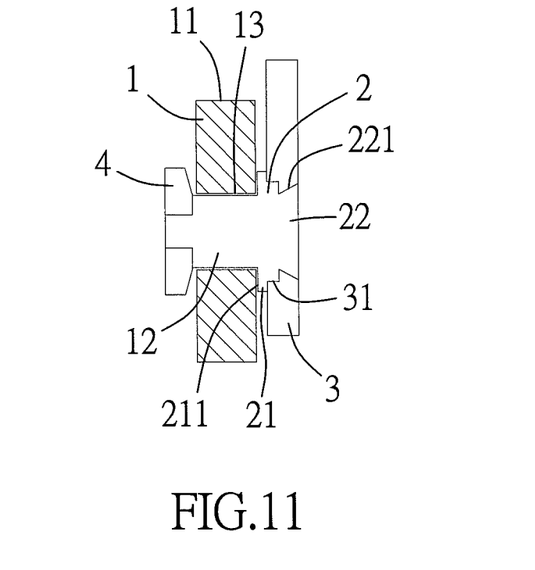
FIG. 11 is a cross-sectional view of the roller structure according to the fifth preferred embodiment of the present invention.

Referring to FIG. 6, preferably, in an embodiment of the present invention, the roller 1 is provided with an inner ring 17a which fits around the axial portion 12. The inner diameter of the inner ring 17a defines the axial hole 13. The contact between the inner ring 17a and the axial portion 12 enhances the mechanical strength of the roller 1 and reduces the wear and tear of the axial hole 13. For example, when the roller 1 is made of a plastic or a rubber, the inner ring 17a is made of a metal of high rigidity. Referring to FIG. 7, the roller 1 is preferably provided with a rolling component 17b for fitting around the axial portion 12 and exemplified by a ball bearing, a needle bearing or an equivalent component, wherein the inner diameter of the rolling component 17b defines the axial hole 13. The rolling component 17b not only functions as well as the inner ring 17a but is also effective in reducing the coefficient of friction between the roller 1 and the axial portion 12 to thereby enable the roller 1 to rotate smoothly. Referring to FIG. 9, the roller 1 is preferably provided with a sliding component 17c for fitting around the axial portion 12 and exemplified by a bush capable of self-lubrication and thus capable of bearing a heavy load and being more durable. Referring to FIG. 10, the second stop portion 4 preferably penetrates the axial portion 12 and is preferably coupled to the axial portion 12 by an expansion mechanism (or a riveting mechanism, a welding mechanism, an engaging mechanism, a fastening mechanism, an adhesion mechanism or a magnetic attraction mechanism), or the second stop portion 4 preferably penetrates the axial portion 12 and the bush 2 and is preferably coupled to the bush 2 by an expansion mechanism (or a riveting mechanism, a welding mechanism, an engaging mechanism, a fastening mechanism, an adhesion mechanism or a magnetic attraction mechanism). Referring to FIG. 11, the axial portion 12 preferably penetrates the second stop portion 4.

As indicated above, according to the present invention, the engaging portion 22 of the bush 2 enables the roller 1 to be mounted on the load 3, and the engaging portion 22 is coupled to the load 3 by a riveting mechanism (shown in FIG. 3), an expansion mechanism (shown in FIG. 5), a welding mechanism (shown in FIG. 6), an engaging mechanism, a fastening mechanism or a magnetic attraction mechanism, or by any other means of fixation. Referring to FIG. 8, the engaging portion 22 of the bush 2 is not directly coupled to the load 3 but is positioned proximate to the load 3 from one side thereof and then coupled to the bush 2 and the load 3 through a connection component 5. Referring to FIG. 9, the present invention is not limited to an embodiment where the first stop portion 21 of the bush 2 is formed integrally with the bush 2; instead, in a variant embodiment, it is also practicable that the first stop portion 21 is provided with a stop component 212 which functions as a hollow-core component, ring, C-ring, clip, bush or bearing for use in penetrable coupling or snug engagement. Likewise, one side of the stop component 212 has the first stop surface 211 corresponding in position to one side of the roller 1 so as to come into smooth contact with the roller 1.

Figure 16:
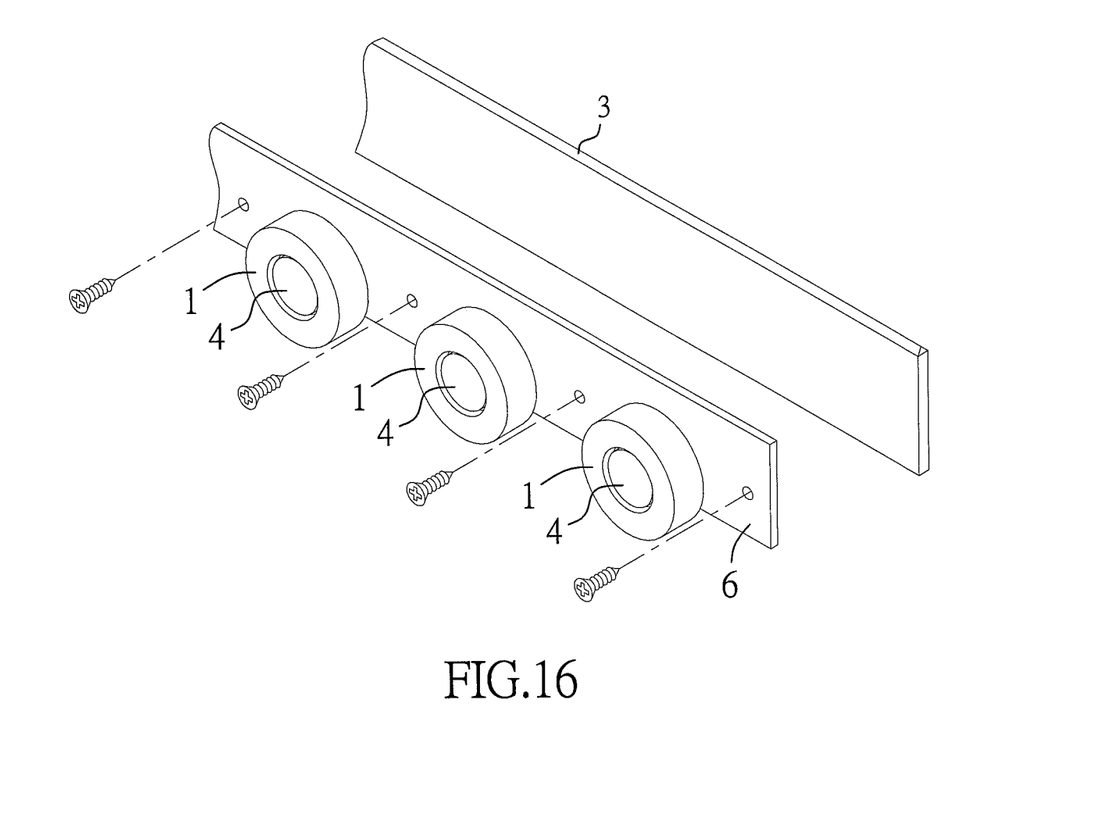
FIG. 16 is an exploded view of a modularized frame according to a preferred embodiment of the present invention.

In addition, the present invention puts no limit on the technical feature that the roller 1 is directly coupled to the load 3 through the bush 2. Referring to FIG. 16, in a variant embodiment, a frame 6 is provided. The engaging portion 22 of the bush 2 is coupled to the frame 6 in advance, and then the engaging portion 22 of the bush 2 is coupled to the load 3 through the frame 6; hence, one or more roller structures of the present invention function as module with standard specifications so as to couple the rollers and the load 3 quickly. In a preferred embodiment, the frame 6 is slender, plate-shaped or of any other geometric shapes as needed, and is coupled to the load 3 by the load 3 by a riveting mechanism, an expansion mechanism, a welding mechanism, an engaging mechanism, a fastening mechanism, a magnetic attraction mechanism, or any equivalent mechanism.

As regards the sequence of the assembly of the roller structures of the present invention, it is feasible that the roller 1 and the axial portion 12 are coupled to the bush 2 and the second stop portion 4 in advance to form a module, and then the engaging portion 22 of the bush 2 is coupled to the load 3 or the frame 6 by one of the aforesaid mechanisms. In a variant embodiment, it is practicable for the roller 1 and the axial portion 12 to be coupled to the second stop portion 4 in advance to form module, and then for the bush 2 to be coupled to the load 3 to form a module, and eventually for the axial portion 12 to be coupled to the bush 2, the two modules are coupled together. However, the aforesaid sequence is subject to changes as needed. In addition, the present invention is characterized in that the engaging portion 22 of the bush 2 is coupled to the load 3 or frame 6 by a riveting mechanism, an expansion mechanism, a welding mechanism, an engaging mechanism, a fastening mechanism or a magnetic attraction mechanism. The engaging portion 22 of the bush 2 has a feeding space 221. After the feeding space 221 has been aligned with an installation hole 31 of the load 3, the material which the load 3 is to be made of is injected into the feeding space 221 of the engaging portion 22 as soon as a die 10 presses against the roller 1 or the second stop portion 4 (shown in FIG. 13) or another die 20 presses against the load 3 (shown in FIG. 13) or the engaging portion 22 (shown in FIG. 15), thereby allowing the engaging portion 22 to be coupled to the load 3 to therefore effectuate quick assembly and enhance the efficiency of assembly. In addition, referring to FIG. 14 and FIG. 15, when the engaging portion 22 of the bush 2 is transformed via a die 20 to have a feeding space 221, the feeding space 221 receives a material of the load 3 to couple the engaging portion 22 to the load 3.

Figure 12:
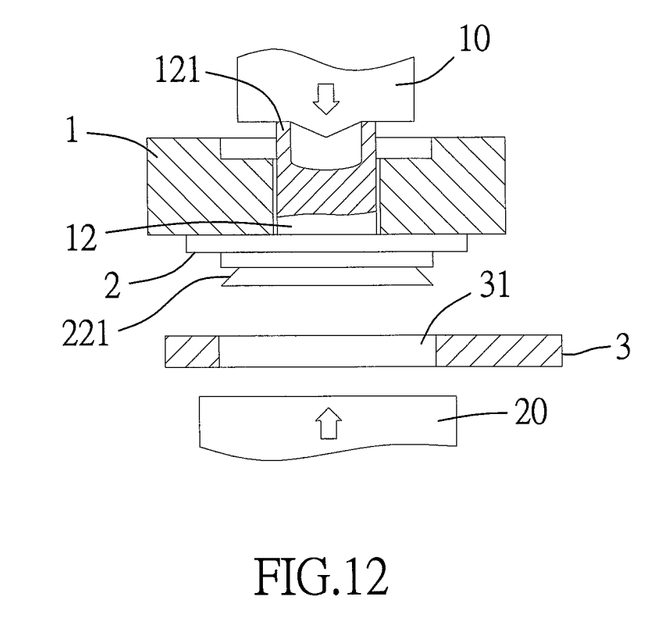
FIG. 12 is a schematic view of a manufacturing method of the roller structure according to the first preferred embodiment of the present invention.
Figure 13:
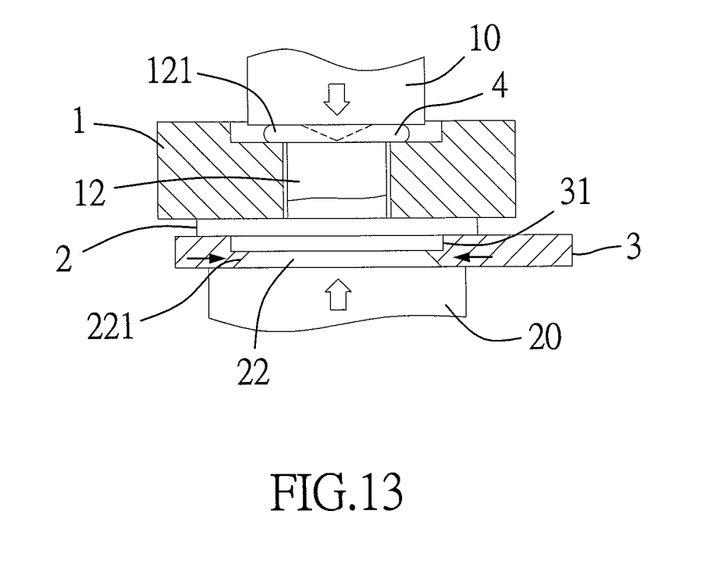
FIG. 13 is a schematic view of the manufacturing method according to the first preferred embodiment of the present invention.
Figure 14:
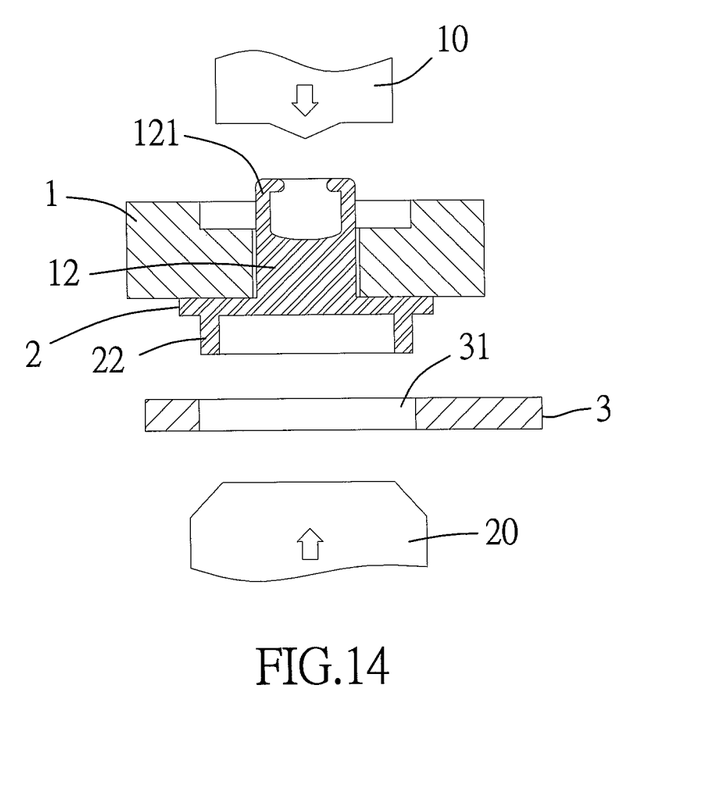
FIG. 14 is a schematic view of the manufacturing method according to the second preferred embodiment of the present invention.
Figure 15:
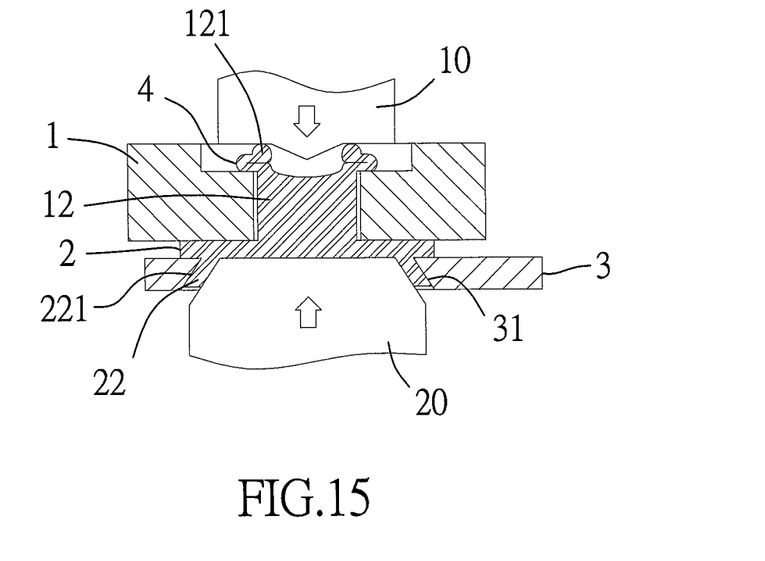
FIG. 15 is a schematic view of the manufacturing method according to the second preferred embodiment of the present invention.

The present invention further provides a manufacturing method for use with the aforesaid roller structure. The manufacturing method is characterized in that: a pressed portion 121 (shown in FIG. 12 and FIG. 14) is disposed at one end of the axial portion 12 by being formed integrally therewith, and the pressed portion 121 is cylindrical or of any equivalent shape. Referring to FIG. 13 and FIG. 15, and the second stop portion 4 positioned proximate to the roller 1 is formed by performing a pressing process on the pressed portion 121 via a die 10. The advantages of the manufacturing method are as follows: the second stop portion 4 is formed quickly; and an assembly process of the roller 1 is quickly carried out especially when the roller structure of the present invention functions as a standardized module.

As regards the manufacturing method for use with the aforesaid roller structure according to the present invention, the engaging portion 22 of the bush 2 is coupled to the load 3 or the frame 6 by a riveting mechanism, an expansion mechanism, a welding mechanism, an engaging mechanism, a fastening mechanism or a magnetic attraction mechanism. The engaging portion 22 of the bush 2 has a feeding space 221; hence, after the feeding space 221 has been aligned with the installation hole 31 of the load 3, the material which the load 3 is to be made of is injected into the feeding space 221 of the engaging portion 22 as soon as a die 10 presses against the roller 1 or the second stop portion 4 (shown in FIG. 13) or another die 20 presses against the load 3 (shown in FIG. 13) or the engaging portion 22 (shown in FIG. 15), thereby allowing the engaging portion 22 to be coupled to the load 3 to therefore effectuate quick assembly and enhance the efficiency of assembly.

Figure 17:
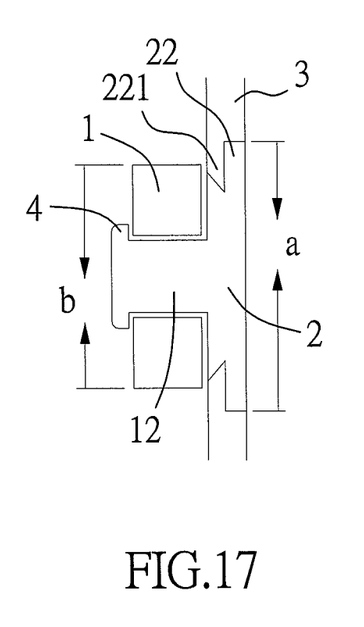
FIG. 17 is a cross-sectional view of the roller structure according to the preferred embodiment of the present invention.
Figure 18:
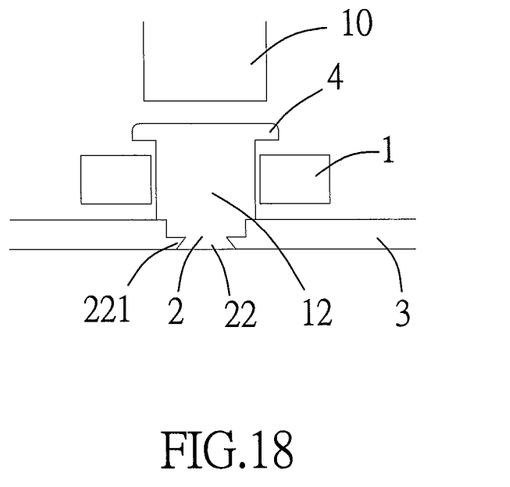
FIG. 18 is a schematic view 1 of the manufacturing method according to the preferred embodiment of the present invention.
Figure 19:
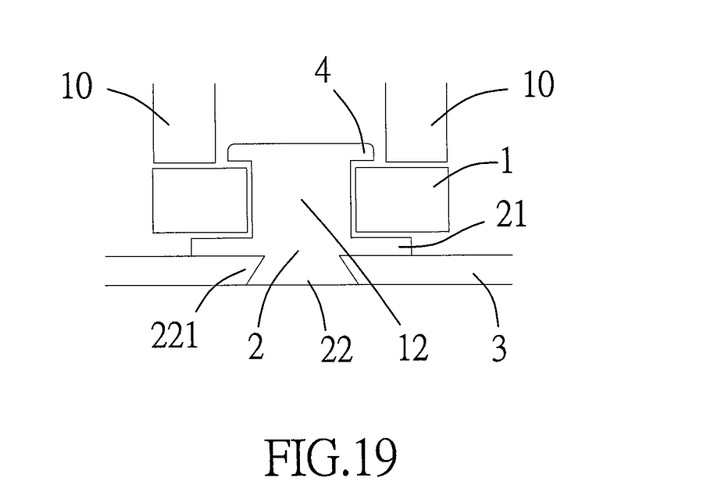
FIG. 19 is a schematic view 2 of the manufacturing method according to the preferred embodiment of the present invention.

Referring to FIG. 3 and FIG. 17, a diameter a of the engaging portion 22 of the bush 2 is larger (shown in FIG. 17) or smaller (shown in FIG. 3) than a diameter b of the roller 1. In addition, the feeding space 221 of the engaging portion 22 of the bush 2 faces the roller 1 (shown in FIG. 17) or faces away from the roller 1 (shown in FIG. 3).

Figure 20:
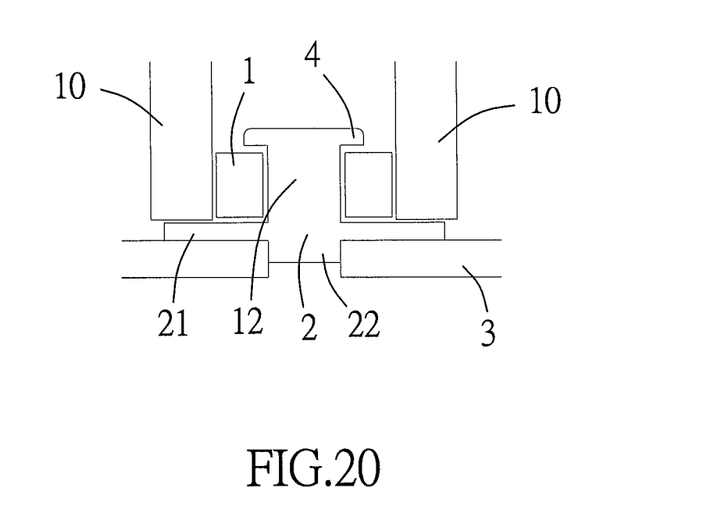
FIG. 20 is a schematic view 3 of the manufacturing method according to the preferred embodiment of the present invention.
Figure 21:
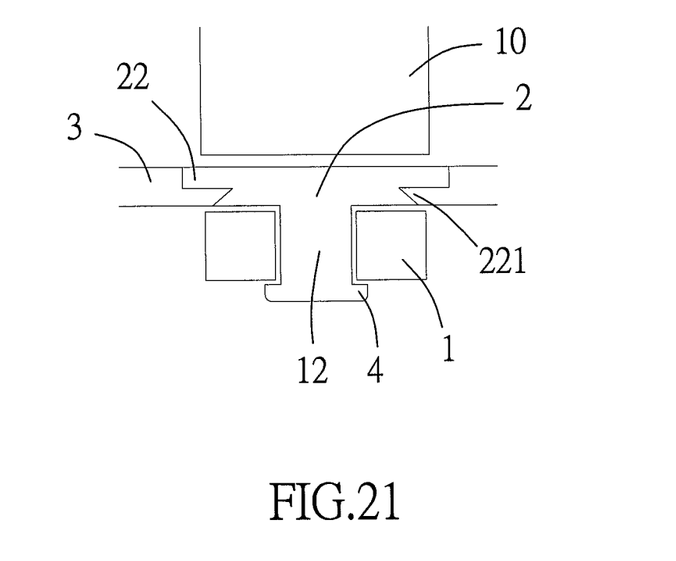
FIG. 21 is a schematic view 4 of the manufacturing method according to the preferred embodiment of the present invention.

Referring to FIG. 16 and FIG. 18 to FIG. 21, the engaging portion 22 of the bush 2 is coupled to the load 3 (or the frame 6) via using a die 10 to press the second stop portion 4 (shown in FIG. 18), the roller 1 (shown in FIG. 19), the engaging portion 22 of the bush 2 (shown in FIG. 21) or the first stop portion 21 of the bush 2 (shown in FIG. 20).

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A roller structure, comprising:
   a roller rotatable about an axial portion, an end of a bush is fixed to an end of the axial portion, and another end of the bush having an engaging portion coupled to a load; and
   a first stop portion disposed at another end of the axial portion and the bush has a second stop portion positioned opposite to the first stop portion such that the roller rotates between the first stop portion and the second stop portion;
   wherein the engaging portion of the bush has a feeding space, the feeding space receives a material of the load to couple the engaging portion to the load.

2. The roller structure of claim 1, wherein the bush is formed integrally with or coupled to the axial portion.

3. The roller structure of claim 2, wherein the first stop portion is formed integrally with or coupled to the axial portion.

4. The roller structure of claim 1, wherein the first stop portion is in form of a stop component fitted around the axial portion, and the axial portion has a third stop portion for limiting movement of the stop component.

5. The roller structure of claim 4, wherein a receiving chamber is concentric with the axial portion and is adapted to receive one of the first stop portion and the third stop portion.

6. The roller structure of claim 1, further comprising a connection component coupled to the axial portion, wherein the first stop portion is in form of a stop component whose movement is limited by the connection component.

7. The roller structure of claim 6, wherein the stop component is in form of a hollow-core component penetrable by the connection component.

8. The roller structure of claim 1, wherein the first stop portion penetrates the axial portion, or the first stop portion penetrates the axial portion and the bush, or the axial portion penetrates the first stop portion.

9. The roller structure of claim 8, wherein the first stop portion penetrates the axial portion and is coupled to the axial portion by a riveting mechanism, an expansion mechanism, a welding mechanism, an engaging mechanism, a fastening mechanism, an adhesion mechanism or a magnetic attraction mechanism, or the first stop portion penetrates the axial portion and the bush and is coupled to the bush by a riveting mechanism, an expansion mechanism, a welding mechanism, an engaging mechanism, a fastening mechanism, an adhesion mechanism or a magnetic attraction mechanism.

10. The roller structure of claim 1, wherein a limiting portion extends from the roller and is disposed on a surface of the first stop portion such that the first stop portion is confined to between the limiting portion and the roller.

11. The roller structure of claim 1, wherein the roller comprises one of an inner ring, a rolling component and a sliding component for fitting around the axial portion.

12. The roller structure of claim 1, wherein the engaging portion of the bush is positioned proximate to a side of the load such that the bush and the load are coupled together by a connection component.

13. The roller structure of claim 1, further comprising a frame which the engaging portion of the bush and the load are coupled to.

14. The roller structure of claim 1, wherein a diameter of the engaging portion is larger or smaller than a diameter of the roller.

15. A manufacturing method of the roller structure of claim 1, comprising a step of forming the second stop portion positioned proximate to a side of the roller by using a die in performing a pressing process on a pressed portion at another end of the axial portion.

\* \* \* \* \*